US011544328B2

(12) United States Patent
Drubner et al.

(10) Patent No.: US 11,544,328 B2
(45) Date of Patent: Jan. 3, 2023

(54) METHOD AND SYSTEM FOR STREAMLINED AUDITING

(71) Applicant: Verus Analytics, LLC, Dover, DE (US)

(72) Inventors: Jeffrey M. Drubner, Waterbury, CT (US); Abner Guzman-Rivera, Waterbury, CT (US); Erik Pabst, Waterbury, CT (US)

(73) Assignee: Kroll Government Solutions, LLC, Wilmington, DE (US)

( * ) Notice: Subject to any disclaimer, the term of this patent is extended or adjusted under 35 U.S.C. 154(b) by 183 days.

(21) Appl. No.: 16/885,243

(22) Filed: May 27, 2020

(65) Prior Publication Data

US 2020/0293575 A1    Sep. 17, 2020

Related U.S. Application Data

(63) Continuation-in-part of application No. 16/699,109, filed on Nov. 29, 2019.

(60) Provisional application No. 62/772,405, filed on Nov. 28, 2018.

(51) Int. Cl.
*G06F 16/90* (2019.01)
*G06F 16/906* (2019.01)
*G06F 16/901* (2019.01)
*G06N 20/00* (2019.01)
*G06F 16/903* (2019.01)

(52) U.S. Cl.
CPC ........ *G06F 16/906* (2019.01); *G06F 16/9024* (2019.01); *G06F 16/90348* (2019.01); *G06N 20/00* (2019.01)

(58) Field of Classification Search
CPC ............... G06F 16/906; G06F 16/9024; G06F 16/90348
See application file for complete search history.

(56) References Cited

U.S. PATENT DOCUMENTS

| | | | |
|---|---|---|---|
| 8,788,407 B1* | 7/2014 | Singh ................ | G06F 16/24578 705/38 |
| 2012/0215791 A1* | 8/2012 | Malik ............... | G06F 16/24578 707/E17.084 |
| 2014/0280130 A1* | 9/2014 | Kumar ................... | G06F 16/23 707/736 |

(Continued)

*Primary Examiner* — Kristopher Andersen
(74) *Attorney, Agent, or Firm* — DeLio Peterson & Curcio LLC; Kelly M. Nowak

(57) ABSTRACT

Methods, systems, and program products for streamlined auditing that receive an input audit request via the data interface; source entity type data (ETD) from one or more databases; prepare the ETD for input into an entity clustering module; match the ETD via the entity clustering module to locate linkages within the ETD and discover relationships amongst one or more entities identified within the ETD; cluster datapoints in the ETD that refer to the same real-world entities; analyze the ETD relationships via an entity intelligence module to identify and segment targeted entities, from the one or more entities, that are applicable to the audit request; generate inclusion lists of those targeted entities that are determined to fulfill the audit request; finalize the inclusion lists of targeted entities that fulfill the audit request to generate streamlined audit results; and output the streamlined audit results to an end user.

20 Claims, 8 Drawing Sheets

(56) References Cited

U.S. PATENT DOCUMENTS

| | | | |
|---|---|---|---|
| 2015/0370838 A1* | 12/2015 | Paradies | G06F 16/9024 707/738 |
| 2020/0074359 A1* | 3/2020 | Subramanian | G06N 5/02 |

* cited by examiner

METHOD AND SYSTEM FOR STREAMLINED AUDITING

PRIORITY APPLICATION

This application is a Continuation-in-Part Patent Applications of U.S. patent application Ser. No. 16/699,109 filed Nov. 29, 2019, which claims the benefit of U.S. Provisional Application Ser. No. 62/772,405 filed Nov. 28, 2018, the entire contents of each being incorporated herein by reference.

BACKGROUND OF THE INVENTION

1. Field of the Invention

The present invention relates to methods, systems and program products for identifying and administering voluminous businesses for streamlined auditing using an entity intelligence infrastructure.

2. Description of Related Art

Federal and State regulatory agencies are responsible for enforcing thousands of laws and regulations imposed on over 30 million businesses across the United States. Often times governments, regulatory agencies, or other entities may desire or need to audit these businesses. Known auditing approaches include manual selection of one or more business for audit to determine whether each business is in compliance with all laws and regulations, or in violation of any such laws and regulations. However, manual selection of these candidate businesses (i.e., businesses) for audit provides inefficient results since the auditors are not able to take into account hundreds of millions of data points that are available from public and private sources. These available data points would allow the scope of potential businesses for audit to be narrowed to those businesses that are most likely to be in violation of applicable state and/or federal laws and regulations.

Thus, improved auditing approaches are needed that take into account the millions of publicly and privately available data points to provide an auditor with streamlined auditing capabilities and results, to which the present invention provides a solution thereto.

SUMMARY OF THE INVENTION

Embodiments of the invention are directed to computing apparatus that includes a processor, memory, a data interface, and one or more logic element modules comprising a streamlined auditing engine. The streamlined auditing engine is adapted for receiving an input audit request via the data interface; sourcing entity type data (ETD) from one or more databases; mining ETD via an entity clustering module to identify data point linkages amongst the ETD; generating a graph of data using ETD data points and the mined linkages, where vertices of the graph comprise the ETD data points and N-dimensional edges of the graph comprise the mined linkages; clustering the ETD data points using the mined linkages via a parallelized hardware component that updates a sparse representation of the ETD graph in-place; generating initial inclusion lists of those targeted entities that are determined to fulfill the audit request; finalizing the initial inclusion lists of targeted entities that fulfill the audit request to generate streamlined audit results; and outputting the streamlined audit results to an end user to fulfill the input audit request.

Other embodiments of the invention are directed to one or more tangible, non-transitory computer-readable storage mediums having stored thereon executable instructions for providing a streamlined auditing engine. The streamlined auditing engine executes instructions to receive an input audit request via the data interface; source entity type data (ETD) from one or more databases; mine ETD via an entity clustering module to identify data point linkages amongst the ETD; generate a graph of data using ETD data points and the mined linkages, where vertices of the graph comprise the ETD data points and N-dimensional edges of the graph comprise the mined linkages; cluster the ETD data points using the mined linkages via a parallelized hardware component that updates a sparse representation of the ETD graph in-place; generate initial inclusion lists of those targeted entities that are determined to fulfill the audit request; finalize the initial inclusion lists of targeted entities that fulfill the audit request to generate streamlined audit results; and output the streamlined audit results to an end user to fulfill the input audit request.

Still other embodiments of the invention are directed to a computer-implemented method of providing streamlined auditing of an audit request. The methods include receiving an input audit request via the data interface; sourcing entity type data (ETD) from one or more databases; mining ETD via an entity clustering module to identify data point linkages amongst the ETD; generating a graph of data using ETD data points and the mined linkages, where vertices of the graph comprise the ETD data points and N-dimensional edges of the graph comprise the mined linkages; clustering the ETD data points using the mined linkages via a parallelized hardware component that updates a sparse representation of the ETD graph in-place; generating initial inclusion lists of those targeted entities that are determined to fulfill the audit request; finalizing the initial inclusion lists of targeted entities that fulfill the audit request to generate streamlined audit results; and outputting the streamlined audit results to an end user to fulfill the input audit request.

Other embodiments of the invention are directed to method, program products, computer program products and systems for implementing the one or more methods of the invention.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF PREFERRED EMBODIMENT(S)

Figure 1:
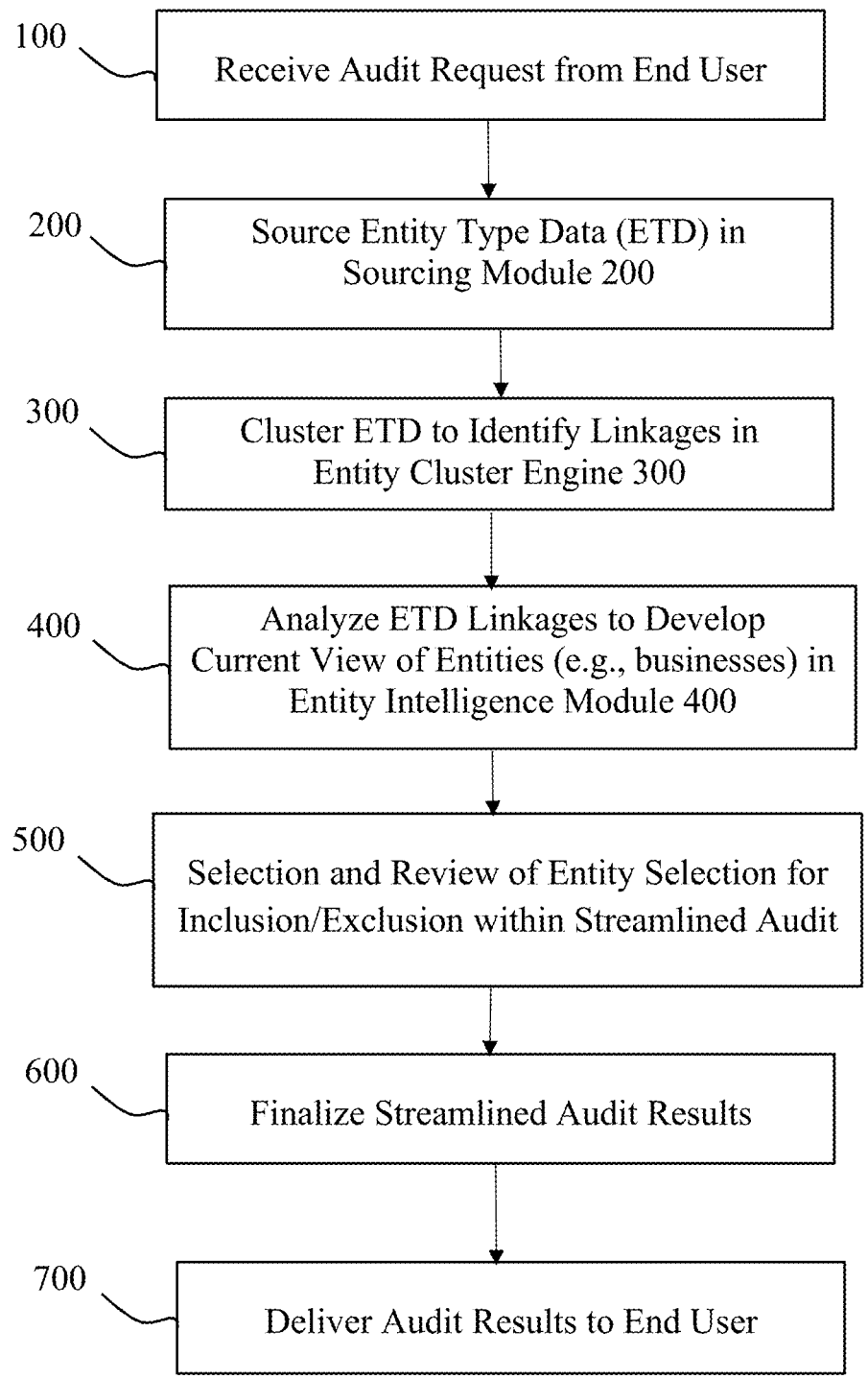
FIG. 1 is a block diagram showing a process flow of the invention for generating and providing streamlined audit results that identifies discrete entities/entity out of numerous potential entities for audit.

In describing the preferred embodiments of the present invention, reference will be made herein to FIGS. 1-8 of the drawings in which like numerals refer to like features of the invention.

Numerous databases exist with each of these data sources including detailed information (i.e., data) relating and/or pertaining to one or more entities. As used herein, the term entities or entity refers to, but is not limited to, businesses, organizations, associations, enterprises, institution, establishment, governmental bodies, principals, agents, person (s), a biological entity, roles, contact information operation, structure, system, third-parties, internal analytics, and the like. These databases may be publicly available databases, private databases, or a combination of public and private databases. Much of the information/data stored within these various public and private databases or data sources comprise disconnected data. The term 'disconnected data' as used herein refers to information/data having no links/linkage to, or affiliation with, other data in one or more databases. The databases themselves and/or the disconnected data information/data contained therein may be disconnected from one another, and as such, may not be sharable with each other, contemporaneously searchable, combinable for analysis, and the like.

Both public and private databases may include voluminous data that is associated with, relates to, or identifies one or more entities. This data is referred to herein as 'entity type data' (ETD) and may include, but is not limited to, entity hierarchical structures, entity legal and organizational configurations (e.g., parent/subsidiary, franchise/franchisee, professional groups/associations, international businesses/interstate businesses, etc.), entity operational status (e.g., whether or not an entity is open business or operational for its intended purpose), entity legal status/information (e.g., business entities may be created, split, merged, closed, or modified at will, and the like), trade or purpose of entity, DBA names, addresses, principals, agents, roles, industry or field within which entity operates, and the like. It may also include more detailed information including, but not limited to, tax information (e.g., tax records, tax filings, etc.), articles of incorporation, SEC filings, insurance information/data/records, and the like.

Entity type data may comprise disconnected data that is affiliated with, relates to, owned by, or connected to a specified entity. In order to determine whether such a specified entity (or various specified entities) are in compliance with state and federal laws and regulations, it is desirable to have access to entity type data that is stored in one or more databases. It would be even more desirable to have access to the most updated entity type data stored throughout various database data sources that may be cross referenced with each other.

Known auditing methodologies for analyzing entities and determining linkages therebetween, or determining linkages between the entity type data associated with one or more entities (e.g., one or more businesses), are often inefficient, time-consuming, provide inaccurate results, and are plagued with problems. For instance, known computerized methods used to match entity type data for forming linkages or associations between various entities require the searching and analysis of vast amounts of data (some of which is not related to the queued search). This is both time consuming and inefficient. Another problem is that the particular databases implemented in the search for linkages may not include the most up to date information for the entity. As with any business entity its legal status may change over time, such as, by split, merger, closing, modification, reorganization into new business, name changes, addresses additions or changes, principal changes, industry/trade alterations, etc. As such, known computerized methods of determining entity type data linkages that employ the use of a limited number of databases and data therein, that may have outdated and/or inaccurate information/data, often provide incorrect linkage data results.

In overcoming the problems associated with these known approaches, the present invention is directed to methods, systems and program products for streamlined auditing using an Entity Intelligence ("EI") infrastructure of the invention that identifies and targets discrete entities/entity out of numerous potential entities for audit. In one or more embodiments the methods, systems and program products of the invention take into account 100's of millions of publicly and privately available data points and narrow such data points to identify those entities (e.g., businesses) that are most likely to be in violation of applicable state and/or federal laws and regulations, thereby providing an end user (e.g., auditor) with streamlined auditing capabilities and results.

Referring to one or more embodiments of the invention, the present methods, systems and program products may be initiated by an end user requesting an audit or list of entities that may require auditing. Referring to FIG. 1, a process flow of the invention shows that the end user requests an audit (step 100), and then the process flow continues to sourcing the various different types of entities through public, private or both public and privately available data bases (step 200). In accordance with the invention, the end user may be an auditor, a state or federal government agency, governmental regulators, a business, a third-party entity, internal analytic departments, or any person/entity that may request an audit or auditing information.

Figure 2:
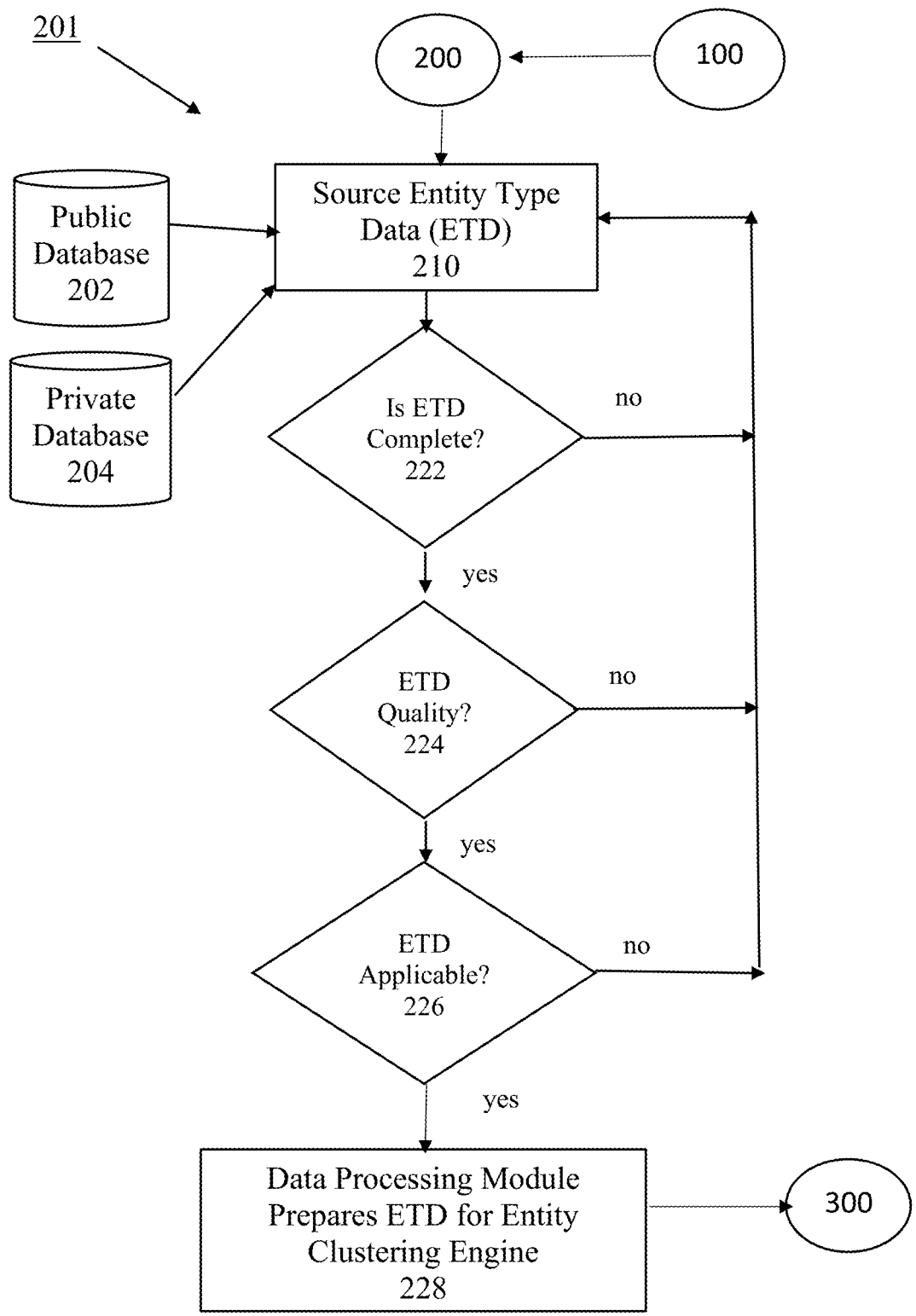
FIG. 2 is a block diagram showing the process flow of sourcing entity type data in accordance with embodiments of the invention.

Referring to FIG. 2, once a request is received, the present methods, systems and program products source the Entity Type Data (ETD) (step 200). In sourcing data, a Sourcing Module 201 of the invention obtains the ETD from public databases 202, private databases 204, or both public and private databases (step 210). It should be appreciated that other data sources providing ETD are also suitable for use in the present invention. A staging environment may be used to acquire such data from the sources. In sourcing the ETD, one or more suitable data sources are identified for obtaining data points from for use in the invention. The sourced ETD is then analyzed and staged (i.e., intermediately storing the data between the sources and a data warehouse) for clustering.

In analyzing the data points, the ETD may be evaluated for completeness (step 222), quality (step 224), and applicability (step 226) to the requested audit. The present methods, systems and program products may apply rules of the invention to first determine if the sourced ETD is complete (step 222). If it is not complete, the flow process reverts back to sourcing additional ETD in step 200. However, if the sourced ETD is complete, the invention then determines if the quality of the ETD is acceptable for running in the Entity Intelligence ("EI") platform of the invention (step 224). If it is not, the process reverts to sourcing additional ETD in step 200. However, if the sourced ETD is complete it is then determined if the acceptable ETD is applicable to the requested audit (step 226.) Again, if the ETD is not applicable to the audit, the flow process reverts back to sourcing additional ETD in step 200, and processing continues as described herein.

Once it is determined that the sourced ETD is complete, is acceptable in quality to be processed in the infrastructures of the invention, and is applicable to the requested audit, such evaluated ETD is prepared for ingestion into clustering (step 228). The ETD may be prepared in a data processing module that is a part of, or separate from, the Sourcing Module 201. In step 228 the data processing module contains one or more processors (e.g., processors A and B) that each translate, validate, verify and scrub incoming ETD files (i.e., records). The ETD data files may be translated into codes that are recognizable by an Entity Clustering Engine 301 of the invention. Once translated into recognizable codes, the data processing module may also validate and verify the incoming ETD by making sure that all input data fields contain at least one meaningful value. These validation and verification processes are performed to prevent any erroneous data from entering the Entity Clustering Engine 301. The processors of the data processing module may also perform a data scrubbing operation to enhance the ETD data files for successful running operation in the Entity Clustering Engine.

Figure 3:
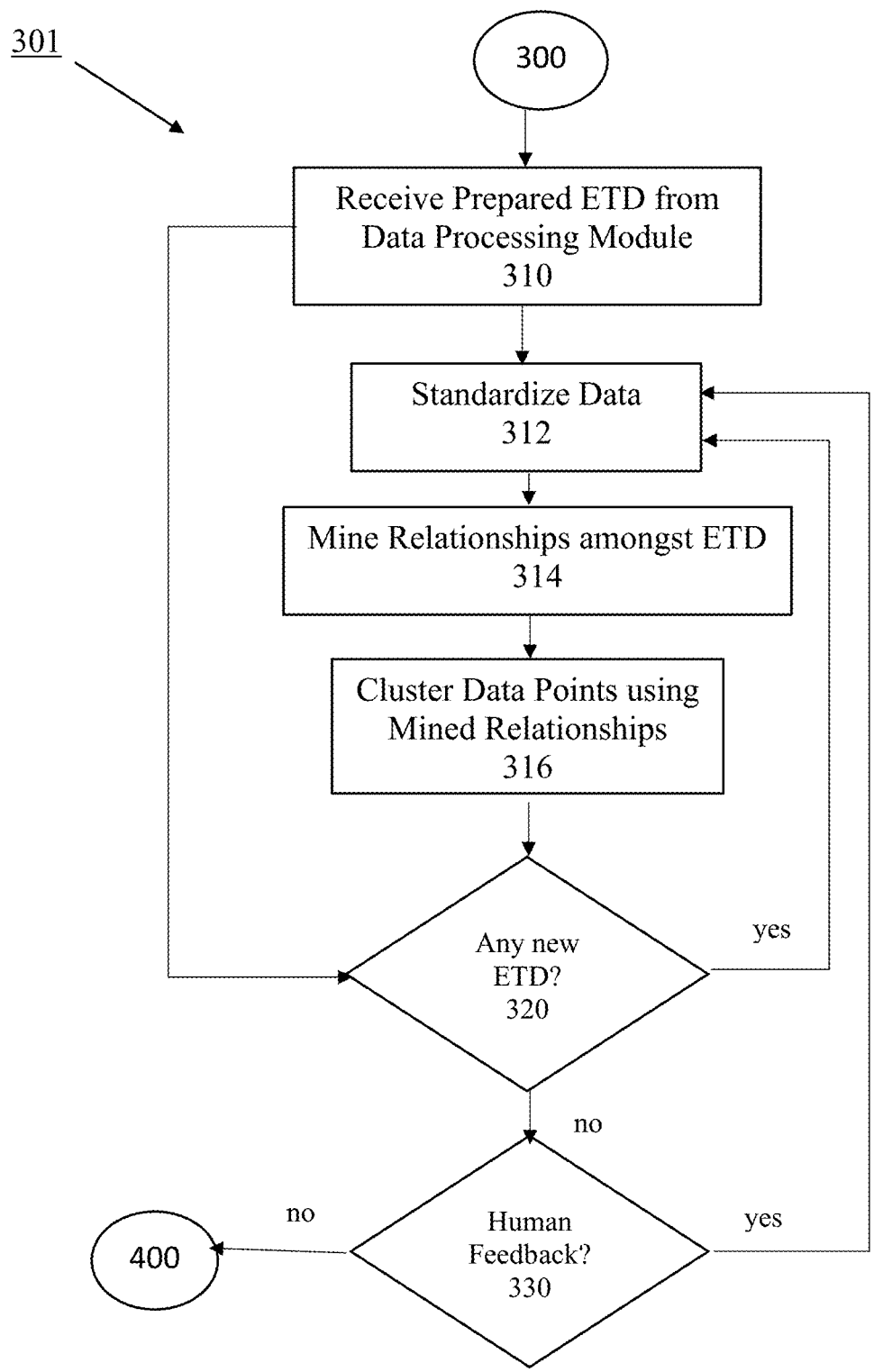
FIG. 3 is a block diagram depicting the process flow of forming clusters of the sourced entity type data from FIG. 2 based on identified links and relationships amongst such entity type data.

Referring to FIG. 3, the processed ETD from step 200 is ingested into an Entity Clustering Engine 301 for clustering the numerous data points of the ETD (step 300). The Entity Cluster Engine 301 automates clustering of the data points in the ETD into entity profiles (e.g., business entity profiles). In scaling the amount of data and data points provided in the clustering engine, the present interactive clustering engine uses sparse representations and optimized updating procedures on these representations to continually update and refresh results. In one or more embodiments, the clustering engine may be implemented in a plurality of highly-parallelized processors (e.g., a farm of NVIDIA VIOO GPU servers) communicating via high-speed connectivity (e.g., Melanox InfiniBand). The clustering engine may also be capable of receiving and handling end user feedback (i.e., human feedback), and processes such input feedback. That is, the clustering engine may be an interactive processor that allows an end user (i.e., human) to input feedback, such as, feedback in the form of business rules and constraints that affect the merging, splitting and/or clustering of the ETD data points. In doing so, the clustering engine is capable of processing the bulk of the data without human intervention, and it is capable of receiving and incorporating end user feedback when desired or needed (e.g., when data is incorrect or purposely misleading) to provide desired results.

In accordance with the invention, the Entity Cluster Engine 301 analyzes, determines, and recognizes relationships amongst and within the incoming data points of the ETD for identifying/qualifying one or more entities within a list of potential auditees. That is, the Entity Cluster Engine 301 identifies and mines (i.e., discovers) linkages and relationships amongst the various ETD data points, whether from existing ETD and/or new incoming ETD data. In doing so, the Entity Cluster Engine 301 may first normalize the ETD data files, followed by linkage mining and scoring, and then clustering the data point using the mined linkages.

Linkages (i.e., edges) are mined in the Entity Cluster Engine 301 using a blocking strategy that works in conjunction with functions used to assign a weight or strength to such linkages which represents the degree of relatedness amongst the data points linked (e.g., probability of match, or degree of similarity) (hereinafter, referred to as "edge-scoring functions"). In doing so, the "strongest" edges (i.e., most relevant to the entity resolution) are identified, while time and resources are minimized scoring "weak" (i.e., non-relevant) edges that have no influence in the resolution of entities. The Entity Clustering Engine works with a plurality of edge-scoring functions and ensuing linkages. Some edge-scoring functions (e.g., string similarity) may be engineered while more complex edge-scoring functions (e.g., probability that two business names co-refer with attention to the semantics of the names) may be learned from data using Supervised Machine Learning techniques like (Deep) Neural Networks. In one or more embodiments of the invention, mining may be done for N-dimensional edges, where each dimension corresponds to different types of ETD attributes such as, e.g., names, addresses, URLs, EINs, SSNs, etc., and where for each dimension there is a specific edge-scoring function.

Once the linkages of data points are mined/discovered, the Entity Cluster Engine generates a graph of data for use in clustering, where the vertices are data points in the ETD while the N-dimensional edges are the mined linkages. The graph may also include declarative linkages that are included, or are a part of, the ETD. The Entity Clustering Engine 301 proceeds to resolve entities via an Unsupervised Machine Learning technique, such as, agglomerative clustering.

In accordance with the invention, the clustering step (i.e., resolution of entities) is performed in-place. That is, specialized parallelized hardware components of the invention update a sparse representation of the graph of ETD data points and mined linkages in-place, i.e., within the hardware and memory (e.g., GPU memory in a plurality of GPU-servers) of the invention. In the invention the sparse-graph is modified in-place so that at each step the updated sparse-graph has as nodes, clusters of original data points, and edges are updated (e.g., aggregated) so as to preserve a proper graph structure. Performing the graph updates in-place, in highly-parallelized hardware of the invention, enables the invention to perform accurate entity resolution on large-scale datasets (e.g., datasets covering the totality of businesses for the entire USA). For instance, as compared to the prior art approaches, performing the required updates in CPU memory would be 1000's of time slower for large problems and an additional 1000's of times slower if disk TO were involved (as in, e.g., a traditional database implementation).

In one or more embodiments, cloud computing may be implemented to scale-up to the massive amounts of datasets or data points used in real-world applications of the invention. For instance, large datasets include those that cover the totality of businesses in the United States of America. Embodiments of the invention that implement cloud technology overcome several challenges of the prior art as these embodiments enable for the processing of large amounts of data. For instance, when the size of the datasets is large (e.g., totality of data for the USA) a solution unable to scale-up would not be able to hold the data in memory for efficient processing. In these prior art approaches, disk TO would be involved which makes the execution 1000's of times slower. Also, when the size of the data sets is large, a solution unable to scale-up, would need to do some of the processing in parts which would necessitate the use of approximations instead of exact solutions as provided by the present invention. Further, when large datasets are used, the processing of such data may take months or even years. Cloud computing in combination with the invention offers immediate linear speedup for the Entity Clustering Engine through the addition of computing nodes (e.g., servers). For example, if N servers can process a set of datasets in P months, 10N servers would be able to process the same set of datasets in P/10 months.

In understanding the clustering process flow 300 of the invention, FIG. 3 shows one or more embodiments thereof. After the ETD is prepared in the Sourcing Module 201, the prepared ETD data files are received from the processing module in step 228 (step 310), and then this ETD is further processed by standardization (step 312). The ETD is standardized to include compatible and consistent formatting, data scrubbing, data correcting etc., so that the ETD may be further processed in the Entity Cluster Engine 301. The Entity Cluster Engine then analyzes and processes the standardized ETD using blocking techniques together with the supervised edge-scoring functions to mine relationships amongst the ETD data points (step 314). Thus, the relationship mining step 312 uses pairwise N-dimensional similarity function(s) to find data points that are "near" (or related) under different notions of similarity as defined by the supervised training of the invention.

For instance, information may be clustered by accurately matching various data points to a correct business entity in order to construct a more complete profile of such business entity that may be subject to potential audit (i.e., a potential audit candidate). In doing so, the invention provides narrowing potential entity candidate pools for audit, from a significantly larger pool, to identify an entity/entities that have the highest degree (most likelihood) of being non-compliant (or in non-compliance) with a rule, law, regulation, agreement (contract), etc. of any business, agency or governmental entity. The mined ETD linkages and relationships from step 314 are used to drive the clustering of ETD datapoints (step 316), into entity profiles that are informed by all available data sources.

In Step 320, if it is determined that there are any new ETD data files received from the processing module 228, then the process flow reverts back to the data standardization step 312 for continued processing and re-clustering (steps 312-316). The processer also checks for any end user feedback input into the Entity Cluster Engine (step 330). If end user feedback is detected, the process flow reverts to the data standardization step 312 for continued processing and re-clustering (steps 312-316). As such, the present invention is capable of revising clusters upon the incorporation and detection of new data and or human feedback (e.g., constraints driven not by the data but an application-specific requirement).

Once the final clusters of discovered (i.e., mined) relationships are provided, and no new data or human feedback are detected, the process flow continues and results delivered to the Entity Intelligence ("EI") interface module 401 of the invention for analysis and segmentation (step 400). In step 400 rules are applied to summarize entities and their attributes and relationships for use in the downstream selection processes (i.e., Steps 500-600).

Figure 4:
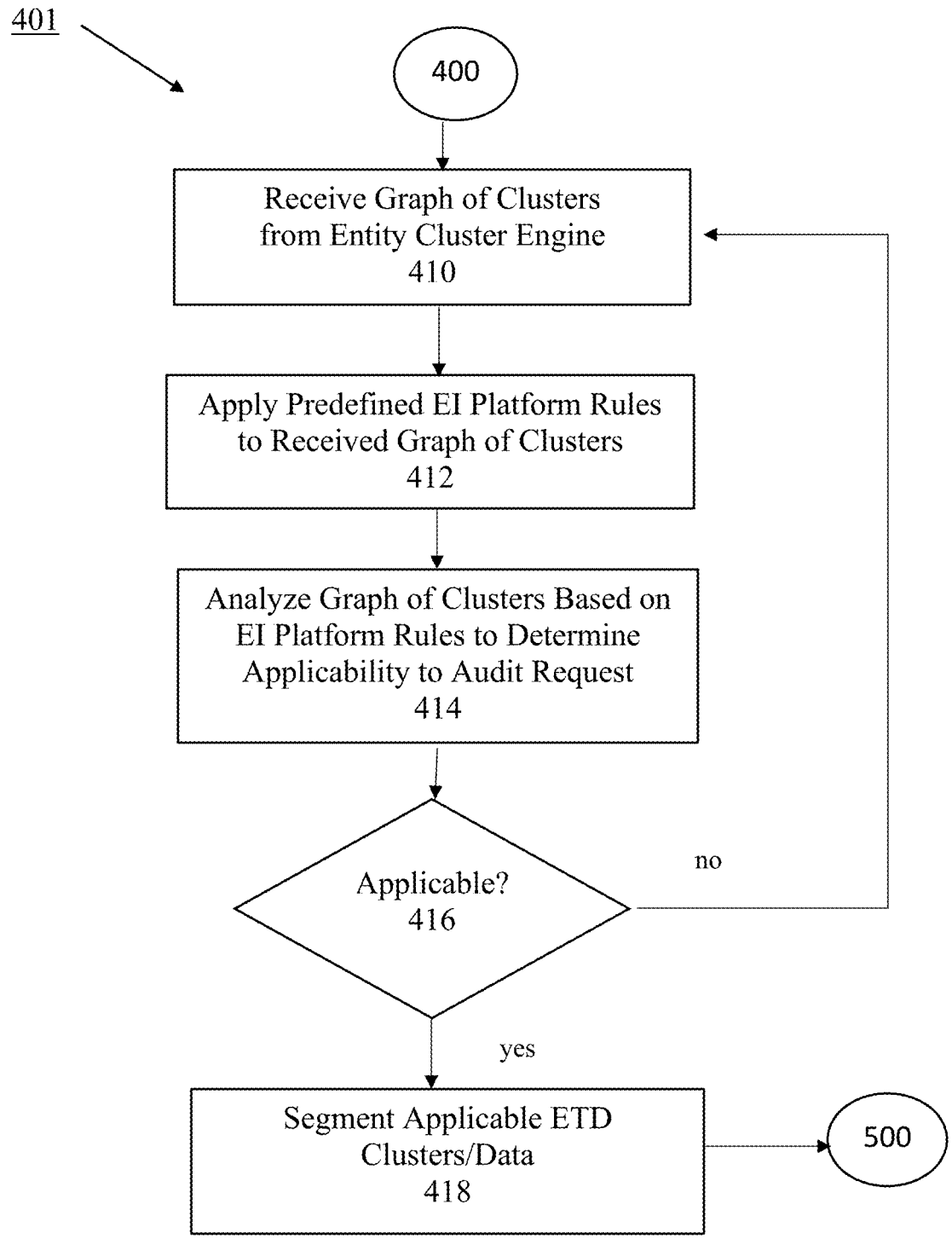
FIG. 4 is a block diagram showing the process flow of processing the clustered entity type data from FIG. 3 to determine its applicability to an initial audit request.

Referring to FIG. 4, the EI module 401 analyzes the preliminary ETD linkage results from the Entity Clustering Engine to form and provide current, updated views of one or more entities, relationships, and their attributes and interconnectedness (e.g., businesses, persons, etc.) for potential audit. The EI module 401 receives the graph of clusters from the Entity Cluster Engine (a graph where nodes are clusters of co-referent datapoints and edges are linkages amongst these clusters) and analyzes it using predefined (or preset) rules. The predefined (preset) rules reside in the EI platform module and are applied to the ETD clusters therein (step 412). Utilizing these rules, the EI module analyzes the graph of clusters and determines whether any clusters, or any data points in each of the various ETD clusters, are applicable to the audit request (step 414). In one or more embodiments, the EI platform rules may be applied for cluster interpretation via a production ETL job(s).

In embodiments of the invention, the graph of clusters may be evaluated by human analysis, in combination with the EI Platform module rule-based analysis, to locate and identify ETD clusters and/or data (i.e., entity data) that are applicable to the audit request. If it is determined that the ETD data is not applicable (step 416), the process flow repeats steps 410-416 until acceptable data or data files are identified. In one or more embodiments, this step of evaluation step may be run in conjunction with the clustering steps, whereby when clustering refreshes (step 300) the data or relationships are also updated (step 400). Any identified ETD clusters and/or data that is applicable to the audit request (step 416) is then segmented for further processing. In segmenting the applicable ETD clusters/data, rules are applied to summarize entities along with their attributes and relationships so they are usable for selection. This step provides current, updated views of one or more entities (e.g., businesses, etc.) for potential audit, and outputs an entity-based view with attributes that may be used to meet business needs (step 418).

Figure 5:
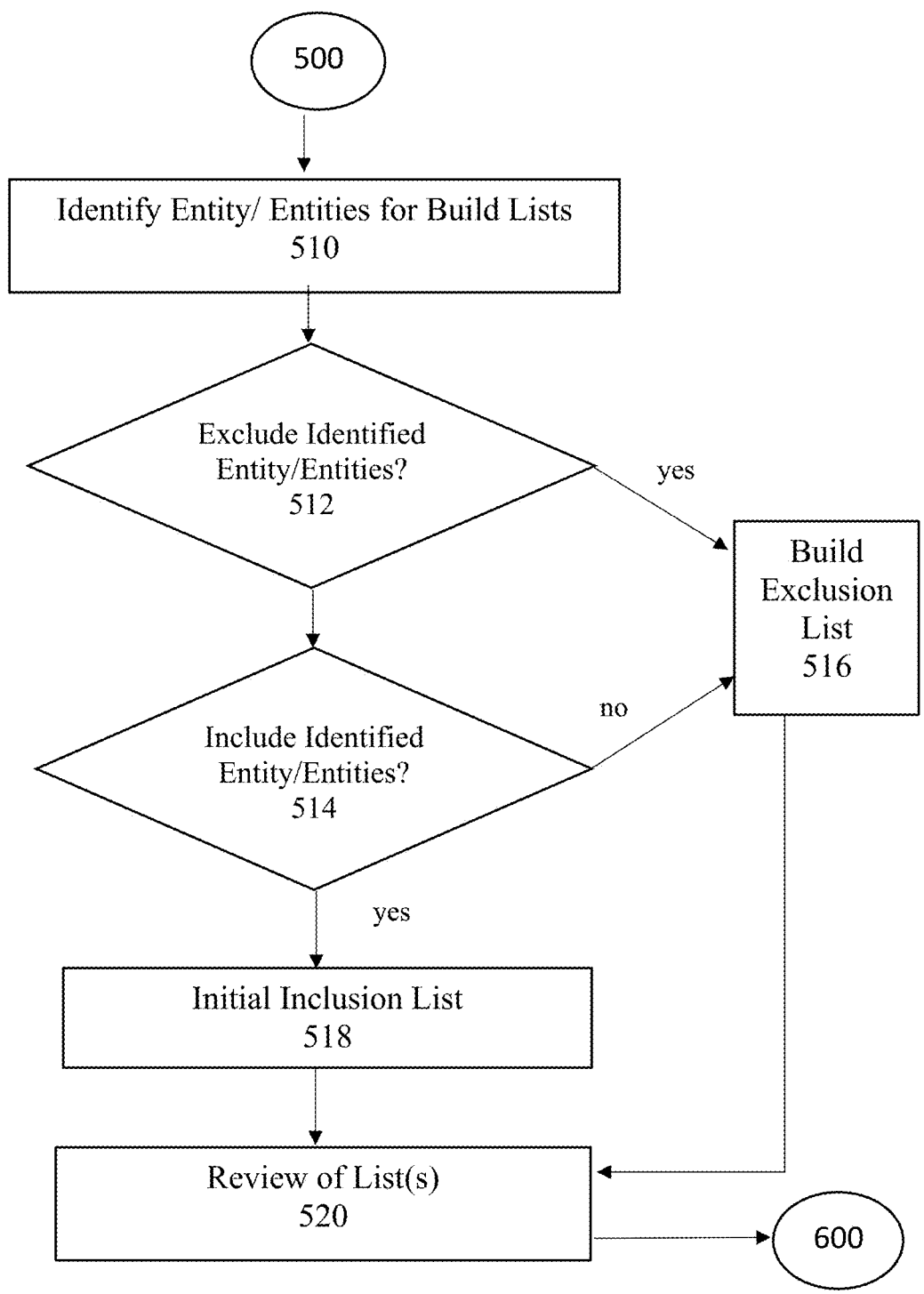
FIG. 5 is a block diagram showing the process flow of analyzing and building inclusion/exclusion lists of the clustered entity type data from FIG. 4 in accordance with the invention.
Figure 6:
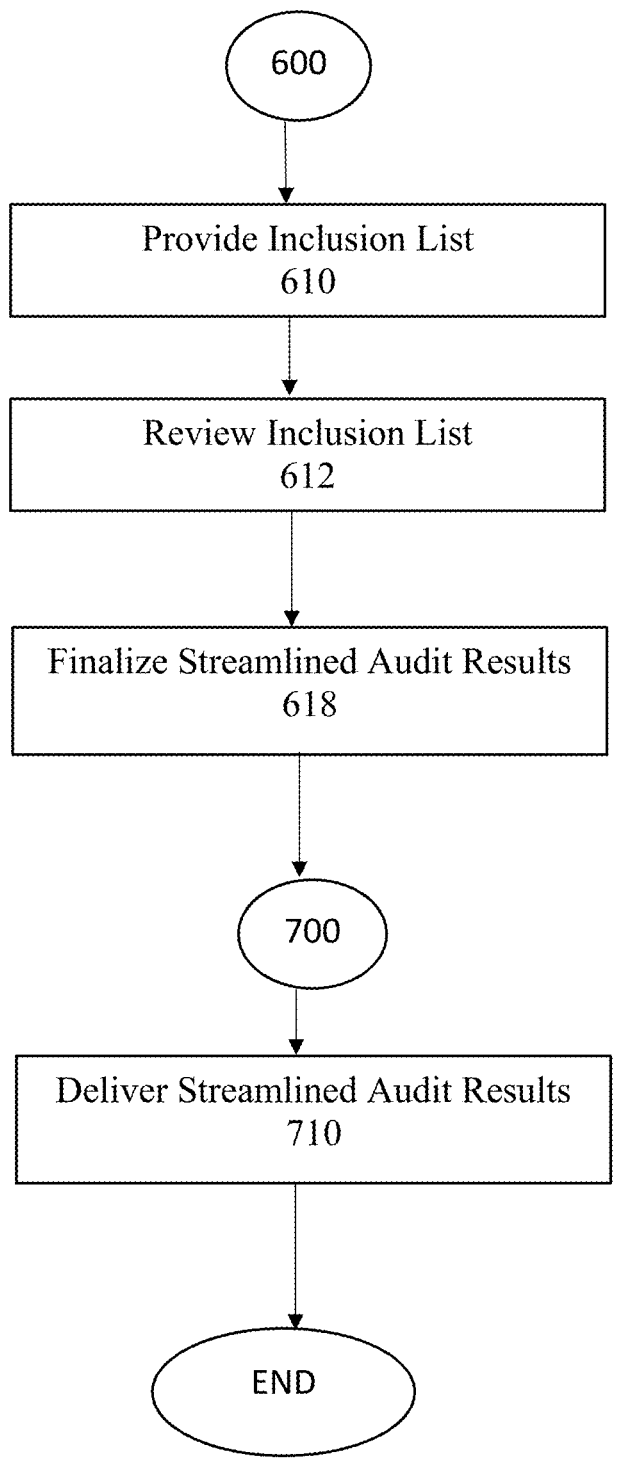
FIG. 6 is a block diagram depicting the process flow of verifying the lists of FIG. 5, and delivering the streamlined inclusion lists of entity type data that identify one or more discrete entities that meet the guidelines for the audit request for auditing by an end user.

Referring to FIG. 5, the segmented views of entities acceptable for potential audit are preliminary selected for fulfilling the audit request (step 500). In this initial audit selection step (step 500), rules and statistical models are applied to classify candidates as to whether they meet, or do not meet, rules for inclusion for a line of business. In doing so a segmentation scheme, aligned with the business needs, uses rules and model selection criteria to develop inclusion and exclusion criteria to classify entities. In the process flow, targeted entities/entity are identified for generating initial list(s) of segmented candidates from the entities (step 510). Once identified, it is determined if such entity/entities should, or needs to, be excluded from the initial lists (step 512). If yes, then such entity/entities are sent to a repository where it can be input into an exclusion list (step 516).

However, if the rules and model selection criteria identify an entity/entities as having the desired criteria that meets the business needs, such entity/entities may be included within the initial inclusion lists (step 514), or it may be input into the exclusion list if not desired in the final results (step 516). The initial inclusion list is formed using the acceptable entity/entities (step 518). In one or more embodiments, analysts may curate these lists of entities/entity for inclusion/exclusion in the present streamlined audits of the invention. In one or more embodiments, analysts may curate these lists of entities/entity for inclusion/exclusion in the present streamlined audits of the invention.

A review of the initial list of segmented candidates is performed (step 520) to confirm accurate results. The review may be made by the present systems and products of the invention, or by an end user (e.g., a business leads, analytics, analyst, etc.). The review may include reviewing criteria including, but not limited to, ensuring accurate selection(s), acceptable data quality, ensuring applicability to the initially requested audit, and the like.

Once it is determined that the inclusion list is accurate (step 520), the final inclusion list(s) of entities/entity is/are reviewed to verify and finalize the streamlined audit results of the invention (step 600). This step 200 may include both technological and human verification processing. In doing so integrated information technology (IT) and/or end user(s) (human) are provided with the final list(s) of entities/entity that are to be included in the audit results (step 610). These inclusion lists and listed entities/entity are analyzed (step 612) for fulfilling the audit request. For instance, criteria that may be analyzed include, but are not limited to, name(s) and address(es) of requester or audit recipient, addressing any audit specific messaging requests (e.g., formatting, delivery modes, etc.). Any corrections and/or changes (e.g., additions, deletions, data changes, etc.) are made to segments/cohorts from the lists and the data therein, and then the resultant list(s) of entities/entity that fulfill the audit request made at step 100 are finalized by generating streamline audit result (step 618). In one or more embodiments, the streamlined audit results may be transferred to a mail-house or a dependent system for delivery.

The streamlined audit results are then delivered to one or more end users (step 700). This may be the requester of the audit, or one or more third-party entity/entities. For instance, the end user may be a particular state or governmental agency that wants to audit potential entities that are at a higher risk of not complying the state and/or federal laws and regulations. Once the streamlined audit results are delivered (step 710) and the end user accepts such results, the process may end. Alternatively, the process may be refreshed by reverting back to sourcing ETD data files (step 200) and continuing through the process flow.

In accordance with the various embodiments, the present methods, systems and program products utilize machine learning approaches to provide an Entity Intelligence (EI) platform that recognizes and identifies direct and indirect linkages and relationships between ETD, and then evaluates such ETD for completeness, quality, and applicability (accuracy) to an audit request/query. The ETD is clustered by accurately matching various data points to one or more correct (e.g., real-world) entity. The invention enables forming complete profiles of potential entities for audit, and provides a streamlined audit result output to an end user. Through the analysis of the invention, business entities may be narrowly selected for audit from a significantly larger pool based on the highest likelihood of non-compliance with the law, rules, guidelines, etc.

The methods, systems and program products of the invention are capable of accepting various types of data (i.e., entity type data) including, but not limited to, data that is complete or fragmented; data from mixed origins (e.g., varying platforms, domains, resources, etc.); data having a spectrum of confidence levels; data having any volume, amount, quantity, timeliness, purpose, etc.; and the like; or even combinations thereof. In various embodiments of the invention, the present methods, EI platform machine learning systems and program products are composed of one or more (or all) of the following core capabilities/functionalities: (1) data sourcing and validation; (2) development of linkage scoring functions; (3) mining for linkages; (4) clustering given N-dimensional weighted edges; (5) entity analytics and segmentation; (6) entity/entities (i.e., candidate) selection and review; and (7) fulfillment of the requested audit. These core capabilities/functionalities of the invention enable sourcing and standardizing data for processing, discovering linkages/relationships, enriching the EI platform/framework, reviewing and selecting candidates, and initiating the resultant audits. In one or more embodiments, each of these core capabilities/functionalities may be dependent upon the preceding functions/activities.

It should be appreciated that the various embodiments of the invention may be embodied as a computer program product stored on a program storage device. These program storage devices may be devised, made and used as a component of a machine utilizing optics, magnetic properties and/or electronics to perform the method steps of the one or more embodiments of the invention. Program storage devices include, but are not limited to, magnetic diskettes, magnetic tapes, optical disks, Read Only Memory (ROM), RAM, floppy disks, a hard disc drive and the like. The methods of the invention may also be distributed using transmission-type media, such as, digital and analog communication links. A computer readable program code means in known source code may be employed to convert the methods described below for use on a computer. In one or more embodiments, the computer programs or software incorporating the process steps and instructions described further below may be stored in any conventional computer. The computer incorporates one or more program storage devices and one or more processors (e.g., modules). Installed on the program storage device is the program code incorporating the methods of the present invention as well as any database information for providing the streamlined audit results of the invention.

Figure 7:
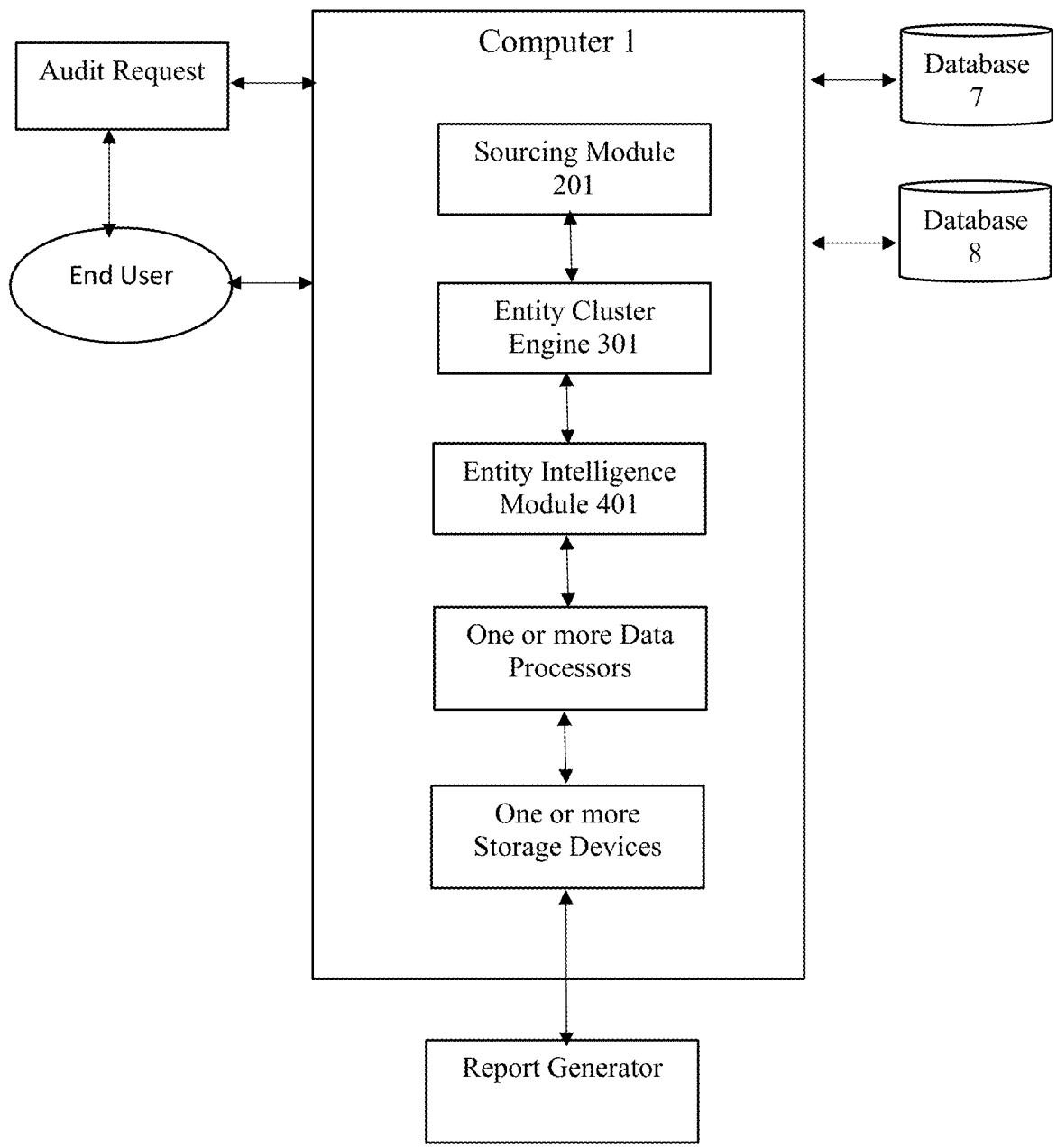
FIG. 7 is a block diagram of a computing device incorporating processors and program storage devices for implementing the various embodiments of the invention.

For instance, FIG. 7 shows an exemplary general-purpose computer system (which may be a personal computer, a server, server farms (e.g., the Cloud), etc.) on which the disclosed methods and systems can be implemented according to the invention. It should be appreciated that the detailed general-purpose computer system can correspond to the computers/processors provided to implement the algorithms described above. That is, referring to FIG. 8, the computer 1 may be capable of receiving an incoming audit request from an end user, as well as be able to receive and output data to one or more databases 7, 8, etc. The computer system 1 for performing the methods and systems of the invention may include, for instance, one or more logic element modules (e.g., sourcing module 201 and entity intelligence module 401), one or more processors, a processor for performing cluster tasks of the invention (e.g., entity cluster engine 301), one or more data interfaces, and one or more storage devices. The Entity Cluster Engine is a software and hardware system that provides distributed parallel processing of big data ecosystems that scales (processes and analyzes) large amounts of data, e.g., Cloud processing. Each of these components may send and receive transmission to each other. The computer system 1 may also be in communication with a report generator for outputting the streamlined audit results of the invention.

Figure 8:
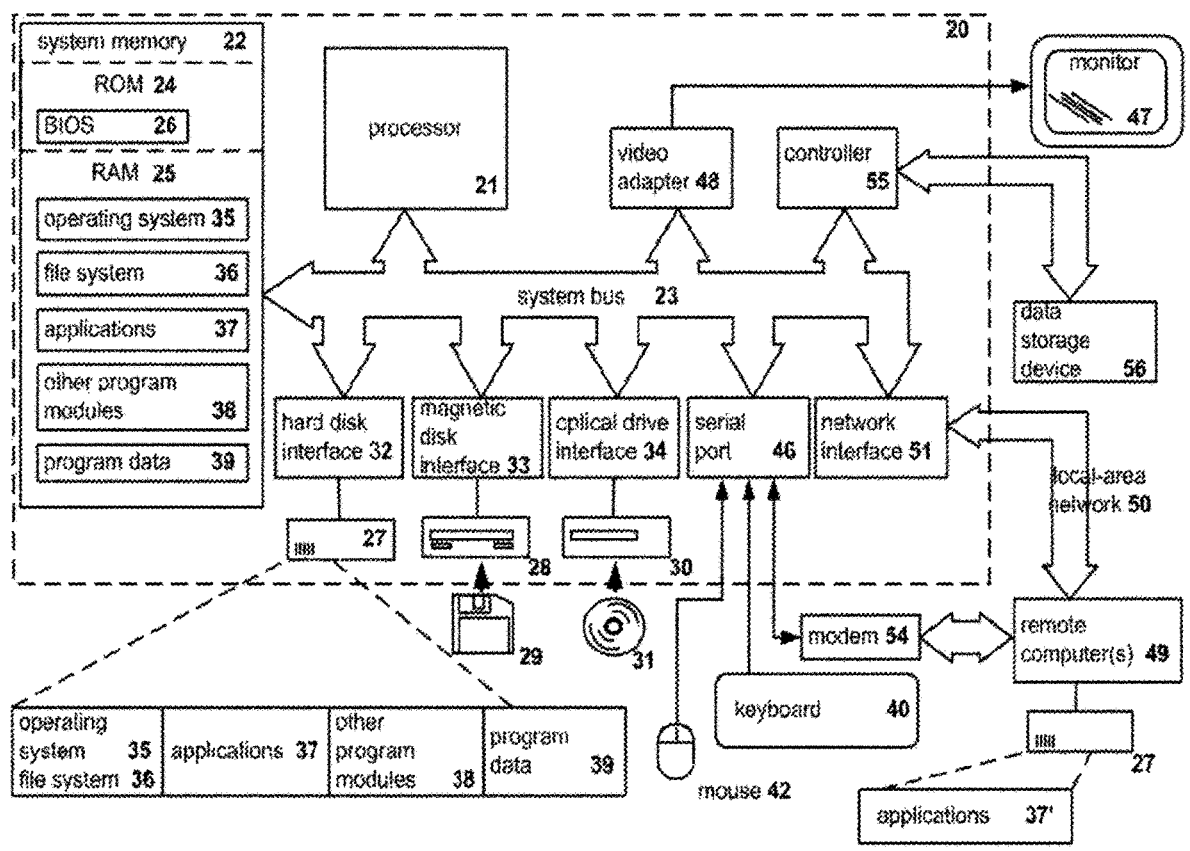
FIG. 8 is a block diagram of an exemplary computing device of FIG. 7 for performing the invention and providing streamlined audit results in accordance with one or more embodiments of the invention.

The computer system 1 of FIG. 7 is shown by computer system 20 in FIG. 8, which includes a farm of nodes (1 to N nodes). The computer system 20 may include a central processing unit 21, a system memory 22 and a system bus 23 connecting the various system components, including the memory associated with the central processing unit 21. The central processing unit 21 can correspond to the CPU 210 and the system memory 22 can correspond to memory 220 of FIG. 1, according to an exemplary aspect. Furthermore, the system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on USBs (not shown) or removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate within a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes. According to one aspect, the remove computer(s) 49 can correspond to the computer devices capable of managing transaction log 140, as discussed above.

Network connections can form a local-area computer network (LAN) 50, such as a wired and/or wireless network, and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules, such as Bluetooth.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A computing apparatus comprising:
   one or more processors;
   a memory;
   a data interface; and
   one or more logic element modules stored in the memory and configured to be executed by the one or more processors to perform:
   receiving at a central processing unit an input audit request via the data interface;
   based on the input audit request sourcing entity type data (ETD) from one or more databases via a sourcing program module of the one or more logic element modules, the ETD identifying one or more entities;
   mining the sourced ETD via an entity clustering engine to identify data point linkages amongst the ETD;
   generating a graph of data via the entity clustering engine using ETD data points and the mined data point linkages, whereby vertices of the graph comprise the ETD data points and N-dimensional edges of the graph comprise the mined data point linkages;
   clustering the ETD data points via the entity clustering engine using the mined data point linkages via a parallelized hardware component that updates a sparse representation of the ETD graph in-place, wherein the clustering comprises update steps, whereby at each update step, the sparse representation is modified in place to have nodes, clusters of original data points, and aggregated edges to preserve structure of the graph, the entity clustering engine comprising an interactive processor that receives feedback from an end user to the ETD data points comprising rules and constraints for merging, splitting and re-clustering the ETD data points and updates and revises clusters of ETD data points;

generating initial inclusion lists using the clustered ETD data points of those targeted entities that are determined to fulfill the audit request;

finalizing the initial inclusion lists of targeted entities that fulfill the audit request to generate streamlined audit results; and outputting the streamlined audit results to the end user to fulfill the input audit request.

2. The computing apparatus of claim 1, wherein the ETD is retrieved from one or more public databases, private databases, and/or both public and private databases.

3. The computing apparatus of claim 1, wherein the mining of ETD is performed for N-dimensional edges, whereby each dimension of the N-dimensional edges corresponds to a different type attribute of the ETD.

4. The computing apparatus of claim 1, further including normalizing the ETD prior to identifying linkages amongst the ETD.

5. The computing apparatus of claim 1, wherein the linkages are mined in the entity clustering engine using a blocking strategy and edge-scoring functions to assign a weight to said linkages.

6. The computing apparatus of claim 5, wherein the edge-scoring functions are learned from data using Supervised Machine Learning techniques.

7. The computing apparatus of claim 6, wherein the clustering resolves entities via Unsupervised Machine Learning techniques.

8. The computing apparatus of claim 7, wherein the entity clustering engine is a hybrid Supervised and Unsupervised Machine Learning clustering system that builds relationships amongst one or more entities identified within the ETD.

9. The computing apparatus of claim 7, wherein the Supervised Machine Learning training approaches generate pairwise N-dimensional similarity function regressors that enable clustering.

10. The computing apparatus of claim 1, further including using cloud computing during one or more steps of the streamlined auditing engine.

11. The computing apparatus of claim 1, wherein in preparing the sourced ETD includes one or more of translating, validating, verifying and/or scrubbing sourced ETD data files to enhance and prevent any erroneous data from entering the entity clustering engine.

12. The computing apparatus of claim 1, wherein the one or more entities is selected from the group consisting of businesses, organizations, associations, enterprises, institution, establishment, governmental bodies, operation, structure, system, third-parties, and internal analytics.

13. The computing apparatus of claim 1, wherein the one or more entities is a person or a biological being.

14. The computing apparatus of claim 1, wherein the ETD is selected from the group consisting of entity hierarchical structures, entity legal and organizational configurations, entity operational status, entity legal status/information, trade or purpose of entity, Doing Business As (DBA) names, addresses, principals, industry or field within which entity operates, tax information, articles of incorporation, Security Exchange Commission (SEC) filings, insurance information, and combinations thereof.

15. The computing apparatus of claim 1, wherein the ETD is associated with a person or a biological being.

16. The computing apparatus of claim 1, wherein the end user may be an auditor, a state or federal government agency, governmental regulators, a business, a third-party entity, internal analytic departments, or any entity that may request an audit or auditing information.

17. The computing apparatus of claim 1, further including receiving input end user feedback into the entity clustering engine to mine ETD, whereby the end user feedback is used to identify the data point linkages amongst the ETD.

18. The computing apparatus of claim 1, wherein the one or more entities identified within the ETD comprise a list of potential auditees that may be non-compliant, in non-compliance, and/or be applicable to the audit request.

19. One or more tangible, non-transitory computer-readable storage mediums having stored thereon executable instructions for providing a streamlined auditing engine to:
receive an input audit request via the data interface;
source entity type data (ETD) from one or more databases;
mine ETD via an entity clustering engine to identify data point linkages amongst the ETD;
generate a graph of data using ETD data points and the mined linkages, where vertices of the graph comprise the ETD data points and N-dimensional edges of the graph comprise the mined data point linkages;
cluster the ETD data points using the mined data point linkages via a parallelized hardware component that updates a sparse representation of the ETD graph in-place, wherein the clustering comprises update steps, whereby at each update step, the sparse representation is modified in place to have nodes, clusters of original data points, and aggregated edges to preserve structure of the graph, the entity clustering engine comprising an interactive processor that receives feedback from an end user to the ETD data points comprising rules and constraints for merging, splitting and re-clustering the ETD data points and updates and revises clusters of ETD data points;
generate initial inclusion lists of those targeted entities that are determined to fulfill the audit request;
finalize the initial inclusion lists of targeted entities that fulfill the audit request to generate streamlined audit results; and
output the streamlined audit results to an end user to fulfill the input audit request.

20. A computer-implemented method of providing streamlined auditing of an audit request, comprising:
receiving an input audit request via the data interface;
sourcing entity type data (ETD) from one or more databases;
mining ETD via an entity clustering engine to identify data point linkages amongst the ETD;
generating a graph of data using ETD data points and the mined linkages, where vertices of the graph comprise the ETD data points and N-dimensional edges of the graph comprise the mined data point linkages;
cluster the ETD data points using the mined data point linkages via a parallelized hardware component that updates a sparse representation of the ETD graph in-place, wherein the clustering comprises update steps, whereby at each update step, the sparse representation is modified in place to have nodes, clusters of original data points, and aggregated edges to preserve structure of the graph, the entity clustering engine comprising an interactive processor that receives feedback from an end user to the ETD data points comprising rules and constraints for merging, splitting and re-clustering the ETD data points and updates and revises clusters of ETD data points;

generating initial inclusion lists of those targeted entities that are determined to fulfill the audit request;

finalizing the initial inclusion lists of targeted entities that fulfill the audit request to generate streamlined audit results; and outputting the streamlined audit results to an end user to fulfill the input audit request.

* * * * *